(12) United States Patent
Lutz

(10) Patent No.: US 8,495,816 B2
(45) Date of Patent: Jul. 30, 2013

(54) METHOD FOR ADJUSTING THE THROTTLING ACTION OF A VALVE

(75) Inventor: Dieter Lutz, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 2022 days.

(21) Appl. No.: 11/354,781

(22) Filed: Feb. 15, 2006

(65) Prior Publication Data

US 2006/0179654 A1    Aug. 17, 2006

(30) Foreign Application Priority Data

Feb. 16, 2005 (DE) .......................... 10 2005 007 010

(51) Int. Cl.
*B23K 26/00*    (2006.01)

(52) U.S. Cl.
USPC ............... 29/890.12; 29/890.132; 72/342.94; 219/121.61

(58) Field of Classification Search
USPC ............... 29/890.12, 888.044, 888.043, 517; 188/322.15, 317, 313, 282.6, 282.3; 403/278; 137/493.8; 72/379.2, 342.94, 342.96; 219/121.8, 121.72, 121.62, 121.61
See application file for complete search history.

(56) References Cited

U.S. PATENT DOCUMENTS

| | | | | |
|---|---|---|---|---|
| 3,816,701 A | * | 6/1974 | Stormer .......................... 219/152 |
| 4,121,704 A | * | 10/1978 | Nicholls ..................... 188/282.6 |
| 5,228,324 A | * | 7/1993 | Frackiewicz et al. ......... 72/342.1 |
| 5,359,872 A | * | 11/1994 | Nashiki .......................... 72/16.1 |
| 5,547,050 A | * | 8/1996 | Beck ........................... 188/282.5 |
| 5,678,307 A | * | 10/1997 | Farwell ...................... 29/890.12 |
| 6,640,604 B2 | * | 11/2003 | Matsushita .................. 72/342.1 |

FOREIGN PATENT DOCUMENTS

| | | |
|---|---|---|
| DE | 43 15 458 | 12/1996 |
| DE | 196 17 387 | 11/1997 |
| DE | 100 38 971 | 2/2002 |
| DE | 102 07 506 | 9/2003 |
| DE | 103 12 164 | 9/2004 |
| GB | 2376514 | * 12/2002 |
| JP | 05177366 | 7/1993 |
| KR | 100276216 | 9/2000 |

OTHER PUBLICATIONS

Translation of Korean Office Action issued in application No. 10-2006-0015086.

* cited by examiner

*Primary Examiner* — Alexander P. Taousakis
(74) *Attorney, Agent, or Firm* — Cozen O'Connor

(57) ABSTRACT

Method for adjusting the throttling action of a valve comprising a valve body with at least one through-channel for a working medium, where the working medium is throttled by at least one valve disk which covers the throttle channel. By making use of the effect of the heat of a laser beam to change the elastic pretension of the disk, deviations from a predetermined throttling action are minimized. The laser beam is used to cause partial local melting in the minimum of one valve disk, the heat thus introduced having the effect of working at least one defined bending axis into the disk.

6 Claims, 3 Drawing Sheets

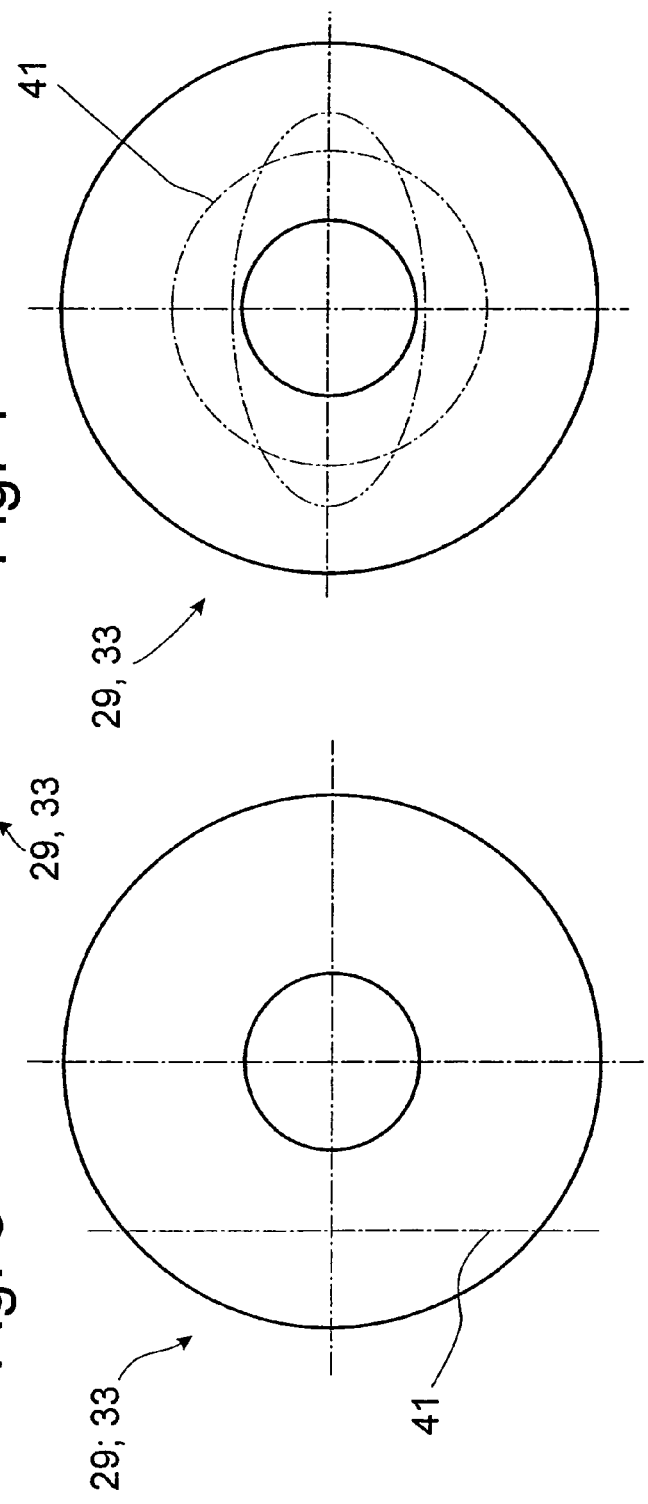

METHOD FOR ADJUSTING THE THROTTLING ACTION OF A VALVE

BACKGROUND OF THE INVENTION

1. Field of the Invention

The invention pertains to a method for adjusting the throttling action of a valve having a valve disk which deforms to effect a throttling action.

2. Description of the Related Art

A damping valve in a vibration damper usually has at least one valve disk, which rises from the surface of a valve seat as a function of the prevailing pressure relationships and thus generates a damping force. A valve disk consists of a material with certain limited elasticity and is mass-produced by stamping. Although the valve disk has a comparatively high degree of dimensional accuracy, the function of the valve is also determined by the clamping diameter, by its position, and by the contact diameter. The direction in which the valve disk was rolled also has an effect. During the course of production, however, it is not possible to mount a valve disk in such a way that that its rolling direction is taken into account.

A valve for a hydraulic telescoping vibration damper is known from U.S. Pat. No. 5,547,050. The design of this valve makes it possible to adjust the individual valve disks. For this purpose, the valve body is connected separately to a piston rod and then provided with valve disks. An adjusting sleeve or stud is used to clamp the valve disks to a certain extent, and by the use of an appropriate device, the lifting force of the valve disks from their seating surfaces can be measured. When the desired lifting force is obtained, the adjusting stud or adjusting sleeve is locked in position. As a result, it is possible to adjust the damping force of the valve to the desired value with considerable precision, regardless of manufacturing tolerances. It is necessary, however, to use a specially designed piston, in particular a specially adapted piston mounting system.

DE 100 38 971 A1, which represents the basic prior art, describes a process for adjusting the throttling action of a valve comprising a valve body with at least one through-channel for a working medium, where the working medium is subjected to a throttling action as a result of the design of the throttling channel. By making use of a laser beam, the component(s) of the valve which determine(s) the throttling action of the valve is/are modified so that deviations from a predetermined throttling action are minimized, this being done by burning a recess in the valve disk as the throttling channel.

SUMMARY OF THE INVENTION

The object of the present invention is to elaborate the basic idea of modifying a valve disk by exposure to heat.

According to the invention, a laser beam is used to cause partial local melting in a valve disk, the heat thus introduced having the effect of working at least one defined bending axis into the disk.

The advantage of having a minimum of one defined bending axis is that it is an essential parameter, by which the opening behavior of the valve can be influenced. The geometric dimensions of an existing valve disk such as its diameter or thickness can be changed only with great difficulty at acceptable cost. A bending axis, however, can be produced comparatively quickly.

According to an advantageous embodiment, the bending axis is laid out as a chord. In the case of a damping valve with uniformly distributed openings for the incoming flow to the valve disk, a preferred sequence of lifting movements is thus obtained.

It is possible, for example, for the valve disk to be thinner in the area of the bending axis.

In the case of a valve disk with the function of a spring washer, the bending axis will be curved, so that the spring force characteristic can be modified uniformly around the circumference.

The bending axis can also be circular or eccentric to the center of the valve disk, which makes it possible, for example, to achieve an especially "soft" response behavior.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 is a plan view of a valve disk according to the invention;

FIG. 4 is a plan view of alternative embodiments of valve disk according to the invention;

FIG. 5 is a cross-section of a single deformation of a valve disk according to the invention;

FIG. 6 is a cross-section of two deformations of a valve disk according to the invention; and FIG. 7 is an enlarged cross-section showing a notch which defines the bending axis.

DETAILED DESCRIPTION OF THE PRESENTLY PREFERRED EMBODIMENTS

Figure 1:
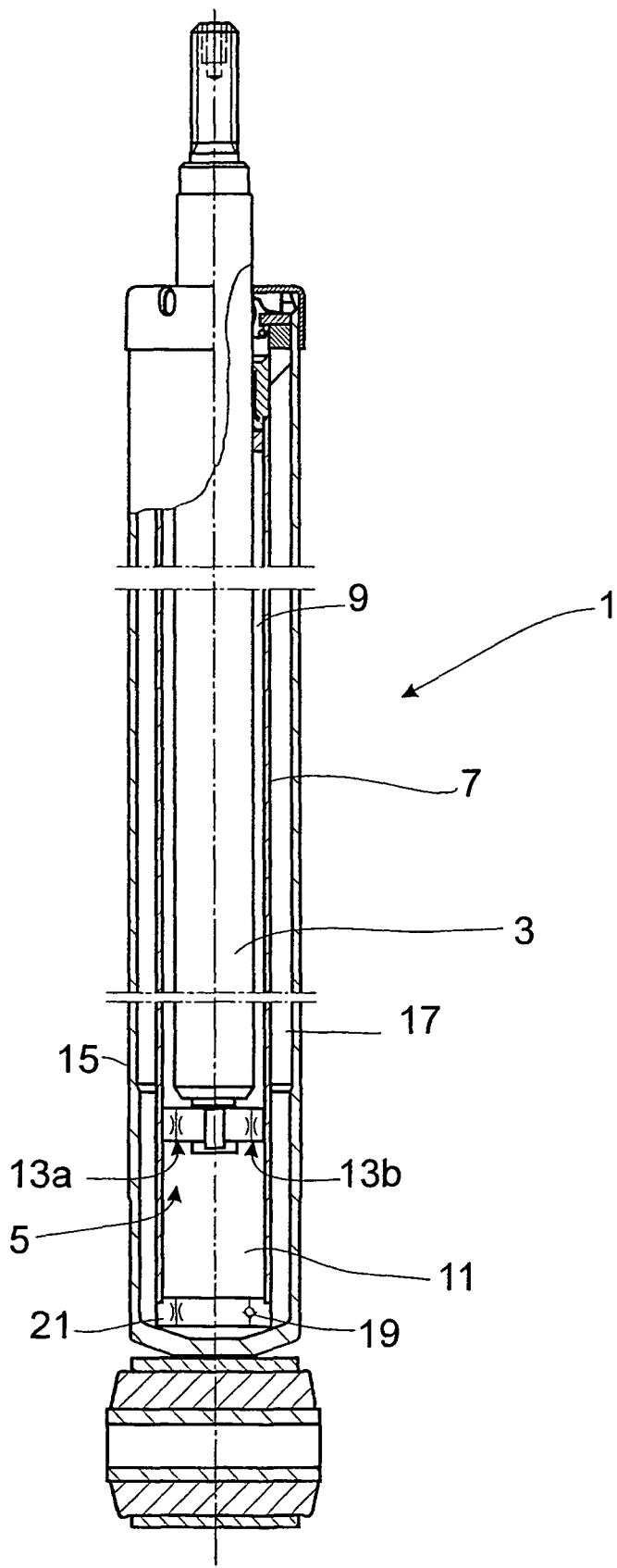
FIG. 1 shows a longitudinal cross section through a vibration damper according to the prior art.

FIG. 1 shows a vibration damper 1 of the two-tube type known in and of itself, in which a piston rod 3 with its piston 5 is guided with freedom of axial movement inside a pressure tube 7. The piston 5 separates the pressure tube into an upper working space 9 and a lower working space 11, the two working spaces being connected to each other by throttle valves 13a, 13b.

The pressure tube 7 is surrounded by a container tube 15, where the inside wall of the container tube and the outside wall of the pressure tube form a compensating space 17. At the lower end of the working space 11, a bottom piece is provided, which has a nonreturn valve 19 and a bottom valve 21.

When the piston rod travels outward, the upper working space 9 becomes smaller and the working medium present in it is displaced through the throttle valve 13a. The nonreturn valve 19 is opened to prevent a negative pressure from developing in the lower working space 11.

When the piston rod travels inward into the pressure tube, the throttle valve 13b and the bottom valve 21 at the bottom of the working space 11 are the active valves. The displaced piston rod volume is compensated by a change of volume in the compensating space 17.

Figure 2:
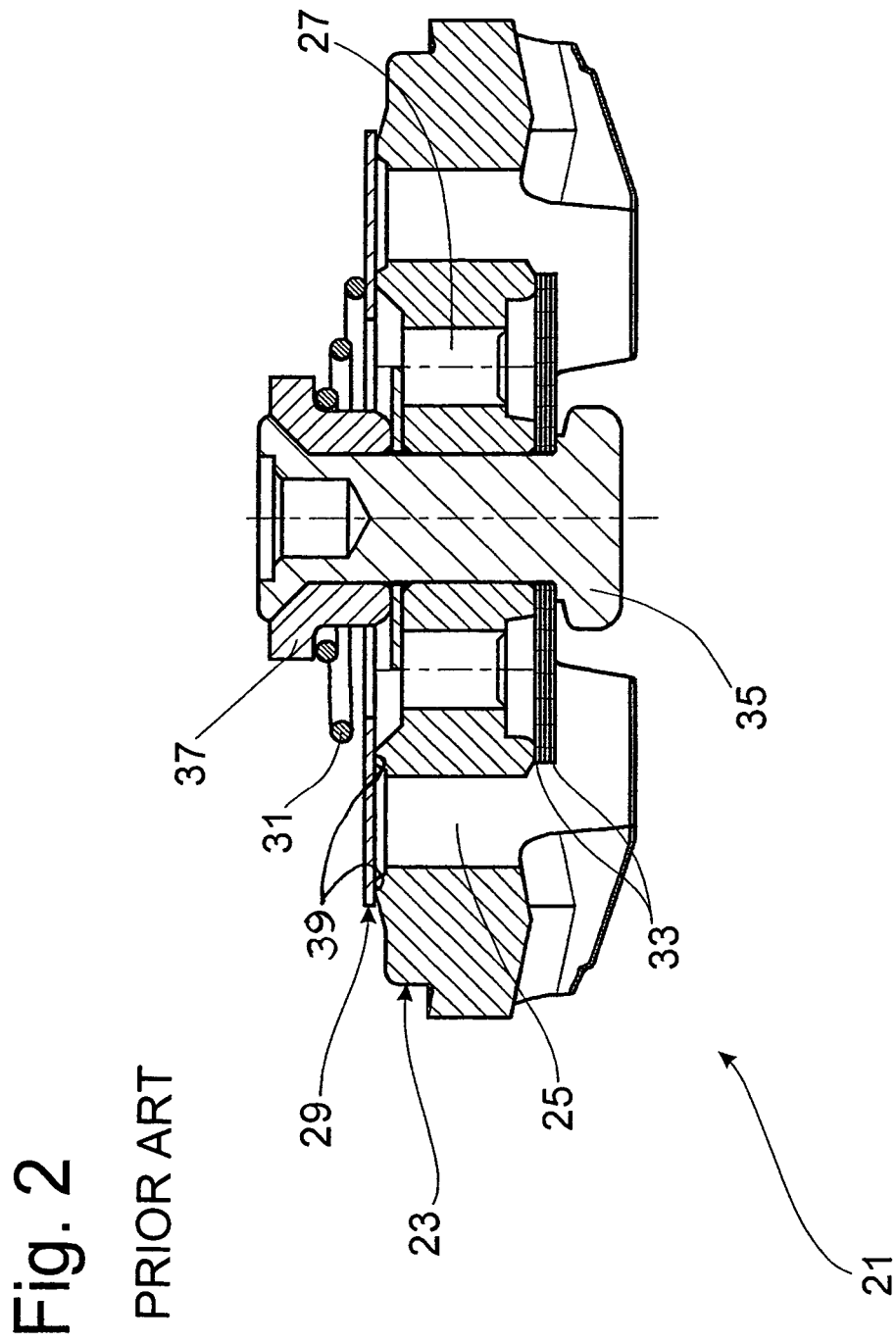
FIG. 2 is a cross-section of the piston valve of FIG. 1.

FIG. 2 shows the bottom valve 21 as a complete assembly. A valve body 23 has throttle channels 25, 27, which connect the working space 11 to the compensating space 17. The throttle channel 25 is covered by a valve disk 29, which is pretensioned in turn by a spring 31. These three components thus form the nonreturn valve 19.

The throttle channels 27 are covered by at least one valve disk 33. A rivet 35 with a clamping sleeve 37 holds all the components together. The valve disks 33 and their arrangement determine the damping force of the vibration damper in the inward-travel direction of the piston rod. Thus, for example, the diameter of a valve sealing surface 39 has a significant effect on the opening behavior of the valve disks 33.

FIG. 3 shows a ring-shaped, elastic valve disk 29 or 33, which is pretensioned onto the valve body 23, where it covers, for example, the throttle channel 25. The heat introduced by a laser is used to work a bending axis 41, laid out as a chord, into the valve disk. As shown in FIGS. 5 and 6, the valve disk is thus deformed along the bending axis 41 around the angle a relative to the plane of the valve disk. By varying the distance to the center, different lever arm lengths can be obtained for the thrust coming from the throttle channel 25, 27. The heat can change the shape of the valve disk and can even thin out the material in the area of the bending axis. This relationship is shown in FIG. 7. In the enlarged view, for example, the V-shaped notch 43 burned in by a laser beam is shown. For production reasons, the penetration depth should not be deeper than 0.5 times the thickness of the valve disk. The change in the shape of the valve disk 29, 33 is produced as a result of the solidification behavior of the melt in the burned-in area 43.

FIG. 4 is intended to show that, in the case of a valve disk 33, the bending axis 41 can also be curved, circular, or even eccentric with respect to the center of the valve disk, depending on the concrete requirements. Depending on the diameter of the bending line, a spring force characteristic is obtained which modifies the damping force characteristic of the damping valve.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. Method for manufacturing a valve comprising a through channel and a valve disk which covers the channel and deforms to throttle a fluid passing through the channel, method comprising:

forming at least one bending axis in the disk by using a laser beam to locally heat the disk in order to cause partial local melting, wherein the at least one bending axis in the disk minimizes deviations from a predetermined throttling action.

2. The method of claim 1 wherein the bending axis is formed as a chord of the disk.

3. The method of claim 1 wherein the local heating by the laser beam causes the disk to be thinner along the bending axis.

4. The method of claim 1 wherein the bending axis is curved.

5. The method of claim 4 wherein the bending axis is circular.

6. The method of claim 4 wherein the bending axis is eccentric to the center of the valve disk.

* * * * *